(12) United States Patent
Blackburn

(10) Patent No.: US 6,942,187 B2
(45) Date of Patent: Sep. 13, 2005

(54) ADJUSTABLE TRIPOD ASSEMBLY

(75) Inventor: Robert Hugh Blackburn, Cheltenham (GB)

(73) Assignee: Clemseven Holdings Pty Ltd., Artarmon (AU)

( * ) Notice: Subject to any disclaimer, the term of this patent is extended or adjusted under 35 U.S.C. 154(b) by 117 days.

(21) Appl. No.: 10/333,162

(22) PCT Filed: Jul. 13, 2001

(86) PCT No.: PCT/AU01/00856

§ 371 (c)(1),
(2), (4) Date: Oct. 14, 2003

(87) PCT Pub. No.: WO02/10635

PCT Pub. Date: Feb. 7, 2002

(65) Prior Publication Data

US 2004/0051010 A1 Mar. 18, 2004

(30) Foreign Application Priority Data

Jul. 31, 2000 (AU) .............................. PQ9105

(51) Int. Cl.⁷ .............................................. F16M 11/00
(52) U.S. Cl. ............................... 248/163.1; 248/188.5; 248/176.3
(58) Field of Search .............................. 248/163.1, 172, 248/440.1, 177.1, 187.1, 176.3, 83, 149, 410, 157, 188.5, 188.8

(56) References Cited

U.S. PATENT DOCUMENTS

| 588,552 | A | * | 8/1897 | Brownell | 248/186.2 |
| 667,624 | A | * | 2/1901 | Hogan | 248/177.1 |
| 1,495,458 | A | * | 5/1924 | Thalhammer | 248/169 |
| 2,668,682 | A | * | 2/1954 | Dalton | 248/169 |
| 3,963,207 | A | * | 6/1976 | Guasti | 248/168 |
| 4,029,279 | A | * | 6/1977 | Nakatani | 248/188.5 |
| 4,767,090 | A | * | 8/1988 | Hartman et al. | 248/168 |
| 4,793,197 | A | | 12/1988 | Petrovsky | |
| 5,253,833 | A | * | 10/1993 | Indou | 248/168 |
| 5,320,316 | A | * | 6/1994 | Baker | 248/163.1 |
| 6,050,531 | A | | 4/2000 | Wilcox | |
| 6,082,685 | A | * | 7/2000 | Hein et al. | 248/161 |
| 6,688,566 | B1 | * | 2/2004 | Crain et al. | 248/168 |
| 6,702,482 | B2 | * | 3/2004 | Sherwin | 396/428 |

FOREIGN PATENT DOCUMENTS

| AU | 14533/97 | | 11/1997 |
| AU | 24750/97 | | 12/1997 |
| DE | 3902828 A1 | * | 8/1990 |
| GB | 2257355 A | * | 1/1993 |

* cited by examiner

Primary Examiner—Anita M. King
(74) Attorney, Agent, or Firm—Schnader Harrison Segal & Lewis LLP

(57) ABSTRACT

A support apparatus of adjustable height having at least one leg assembly with a first leg unit, a second leg unit and a third leg unit. The first and second leg units are slidably movable relative to each other, and the second and third leg units are slidably movable relative to each other. A first fixing clamp selectively locks and unlocks the first leg unit relative to the second leg unit, and a second fixing clamp selectively locks and unlocks the first leg unit relative to the second leg unit. First and second actuating levers are independently actuatable to selectively lock and unlock the first and second fixing levers. The first and second actuating clamps can be operated simultaneously to simultaneously lock or unlock both of the first and second fixing clamps, irrespective of the positions of the first, second and third leg units relative to each other.

16 Claims, 5 Drawing Sheets

ADJUSTABLE TRIPOD ASSEMBLY

FIELD OF THE INVENTION

The present invention relates to a support means of adjustable height. The present invention is particularly suitable for use as a tripod, such as a tripod used in still photography or moving picture recording or transmitting. The present invention also relates to a leg assembly for use in support means.

BACKGROUND OF THE INVENTION

Support means of adjustable height, such as tripods, are known in the present art. One such support means is known as a two stage tripod. Such tripods have three leg assemblies, with each leg assembly comprising a first leg unit, a second leg unit and a third leg unit. In order to enable the height of the tripod to be adjusted, the first and second leg units are slidably movable relative to each other and the second and third leg units are also slidably movable relative to each other. Each leg assembly also includes a first fixing means for selectively locking and unlocking the first leg unit relative to the second leg unit and a second fixing means for selectively locking and unlocking the second leg unit relative to the third leg unit. When the first fixing means is in the unlocked position, the first and second leg units are movable with respect to each other, whilst in the locked position the first and second leg units are held in fixed (or locked) in relation to each other. The second fixing means operates in a similar fashion with respect to the second and third leg units. Such tripods are known as two stage tripods because they have two fixing means on each leg assembly.

Such tripods have found wide acceptance and are used throughout the world. Although they are popular, such tripods suffer from the disadvantage of requiring two fixing means on each leg assembly to be operated to properly adjust the height thereof. This can be time consuming. Moreover, the lower fixing means frequently require that the user bend over in order to operate them. This can be inconvenient and cause difficulty if the tripod has heavy camera gear mounted thereon.

One possible solution to the above difficulties has been proposed by Australian Patent No 709257 in the name of Sachtler Agreement (equivalent to U.S. Pat. No. 5,887,835). In this patent, the actuating means for actuating the first fixing means is also connected to the second fixing means such that operating the first actuating means to lock the first fixing means also simultaneously locks the second fixing means. Similarly, operating the first actuating means to unlock the first fixing means also simultaneously unlocks the second fixing means. Thus, locking and unlocking of each leg assembly of the tripod is simplified.

SUMMARY OF THE INVENTION

In one aspect, the present invention provides a support means of adjustable height comprising at least one leg assembly having a first leg unit, a second leg unit and a third leg unit, said first and second leg units being slidably movable relative to each other, said second and third leg units being slidably movable relative to each other, first fixing means for selectively locking and unlocking the first leg unit relative to the second leg unit, second fixing means for selectively locking and unlocking the third leg unit relative to the second leg unit, first actuating means for selectively actuating the first fixing means between locked and unlocked positions and second actuating means for selectively actuating the second fixing means between locked and unlocked positions, characterised in that the first and second actuating means are independently actuatable to selectively and independently lock or unlock the first fixing means and the second fixing means and the first actuating means and the second actuating means are positioned in close proximity to each other such that the first actuating means and the second actuating means can be operated essentially simultaneously by a user to thereby essentially simultaneously lock or unlock the first fixing means and the second fixing means.

It is preferred that the first actuating means and the second actuating means are operable by the hand of the user.

The first actuating means and the second actuating means are preferably positioned substantially adjacent to each other. Preferably, the second actuating means is positioned adjacent to and below the first actuating means.

In one embodiment, the second actuating means is positioned away from the second fixing means. In this embodiments, the second actuating means may be connected to the second fixing means by a connecting member. Operation of the second actuating means will cause the connecting member to also actuate and move the second fixing means from the locked position to the unlocked position and vice versa. The connecting means suitably comprises a torsion bar.

The support means of the present invention is preferably a tripod, especially a tripod used for supporting camera equipment. Such tripods are known and include a platform to which the camera equipment (such as cameras and fluid heads) may be mounted, and three leg assemblies attached to the platform. Such tripods may have a number of fixing means used to lock the leg assemblies into place when the tripod is correctly adjusted. The present invention encompasses all such fixing means.

An especially suitable fixing means comprises a clamping means for clamping the leg units to prevent relative movement of the leg units.

In one embodiment of the present invention, the first actuating means comprises a first lever and the second actuating means comprises a second lever. The first and second levers may operate by rotating around respective pivot points. The first and second levers may also include an eccentric such that the levers can be moved to overcome a dead centre to thereby lock the respective fixing means. Again, such arrangements are known and need not be described further.

The support means of the present invention is preferably arranged such that the first fixing means and the second fixing means are mounted at a fixed spacing, more preferably with both fixing means mounted to the second leg unit. This will ensure that the distance between the first and second fixing means does not vary. The second leg unit is preferably an intermediate leg unit, with the first leg unit being an upper leg unit and the third leg unit being a lower leg unit.

The second leg unit may comprise a plurality of legs spaced laterally apart, with a first cross member extending between the legs to hold the legs in spaced apart relationship. The first cross-members may include receiving means for slidably receiving one or more legs of the first leg unit. The first fixing means may operate by clamping the one or more legs of the first leg unit. In this fashion, the height of the first leg unit relative to the second leg unit can be adjusted.

Alternatively, the leg(s) of the first leg unit may be telescopically slidable in the legs of the second leg unit.

The second leg unit may also have a second cross member extending between the plurality of legs of the second leg unit. The second cross member also assists in holding the legs of the second leg unit in spaced apart relationship. The second cross member may include receiving means for slidably receiving one or more legs of the third leg unit. The second fixing means preferably works by clamping the leg(s) of the third leg unit.

Alternatively, the leg(s) of the third leg unit may be telescopically received within the legs of the second leg unit.

In the embodiment of the present invention which includes first and second cross members, the first fixing means is preferably mounted on the first cross member and the second fixing means is preferably mounted on the second cross member.

The present invention provides a support means of adjustable height in which the height can be easily adjusted and the leg units locked into position relative to each other by a simplified action. The apparatus also provides the added flexibility of being able to independently lock the leg units such that locking the first and second leg units relative to each other does not necessarily lock the second and third leg units relative to each other. In this regard, the apparatus of the present invention can be used in a distinct fashion to the apparatus disclosed in Australian patent no. 709257.

The present invention also encompasses the leg assembly described above.

A preferred embodiment of the present invention will now be described with reference to the accompanying drawings in which.

In considering the description hereunder and the accompanying drawings, it will be appreciated that the drawings show a presently preferred embodiment of the invention and the drawings should not be considered to restrict the invention to the specific embodiment shown therein.

Figure 1:
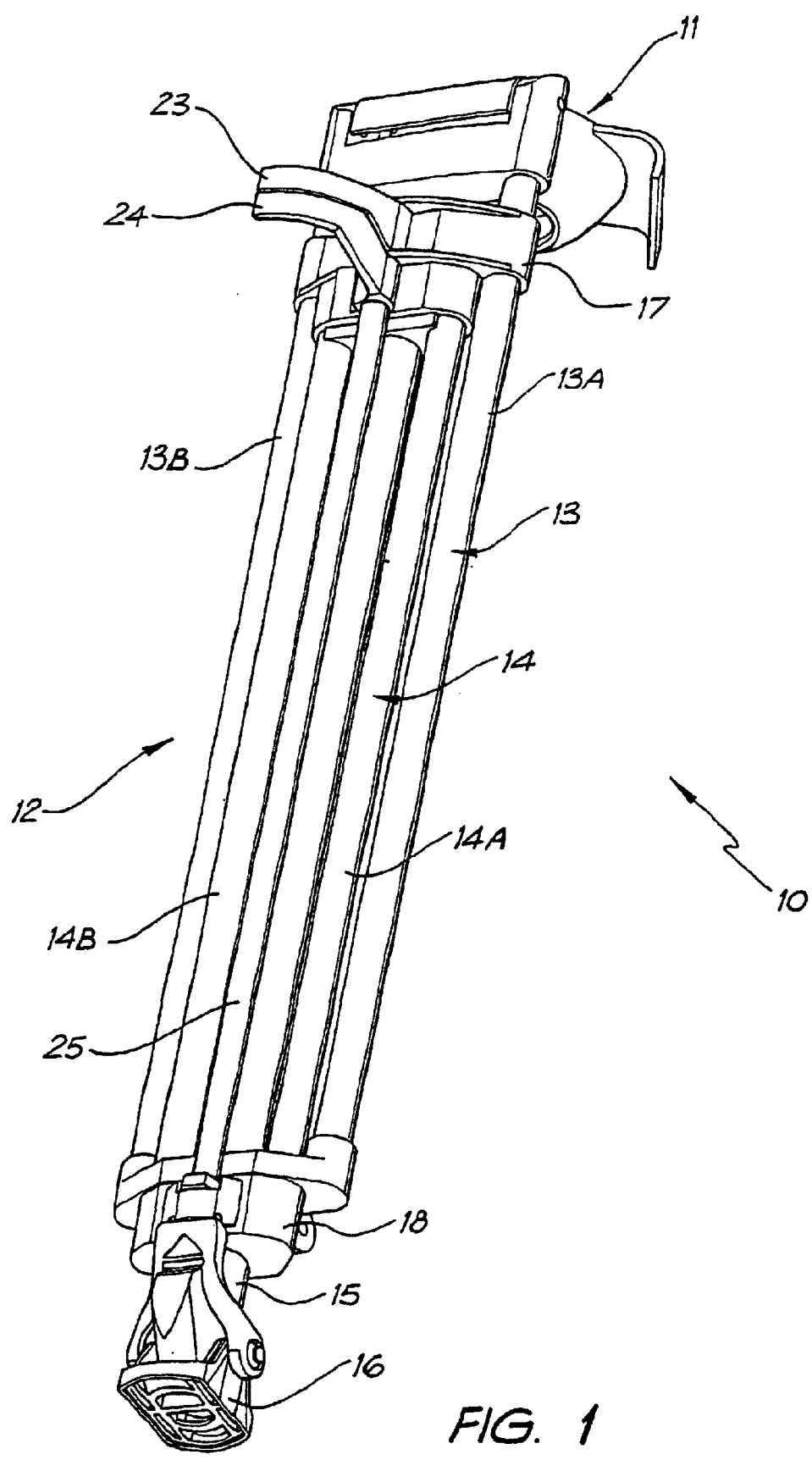
FIG. 1 shows a three-dimensional view of a camera tripod in accordance with the present invention.
Figure 4:
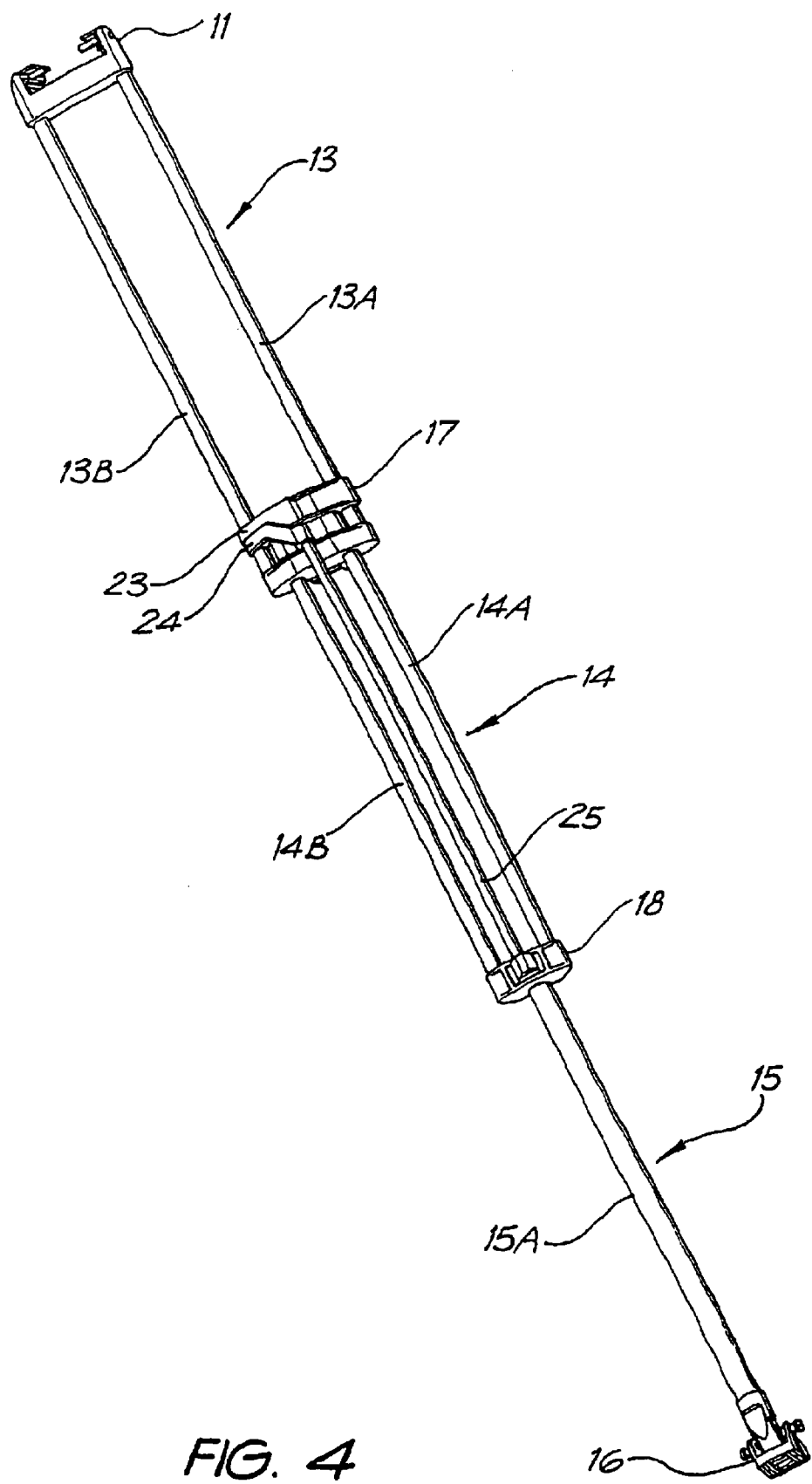
FIG. 4 is a similar view to FIG. 1, but with the leg units extended.

Turning firstly to FIG. 1, it will be noted that FIG. 1 shows one leg assembly of a tripod. The tripod will, of course, include three leg assemblies that are essentially identical to the leg assembly shown in FIG. 1. However, for the sake of clarity, the other two leg assemblies have been omitted from FIG. 1. The tripod 10, part of which is shown in FIG. 1, includes a platform 11. Platform 11 is designed to have camera equipment, such as fluid heads and cameras mounted thereto. The tripod further includes a first leg assembly 12 and second and third leg assemblies (not shown), each leg assembly being mounted to the platform 11. The leg assembly 12 is a three-leg unit leg assembly that includes first leg unit 13, second leg unit 14 and third leg unit 15. The first leg unit 13 includes legs 13A and 13B. Similarly, second leg unit 14 includes legs 14A and 14B. It can be seen from FIG. 1 that legs 14A and 14B of second leg unit 14 are laterally spaced from each other. This third leg unit 15 includes one leg 15A as best shown in FIG. 4.

It will also be noted that third leg unit 15 includes a foot 16 mounted at the lowermost part thereof.

The leg assembly 12 further includes an upper cross member 17 and a lower cross member 18. Upper cross member 17 includes openings 19, 20 (best shown in FIGS. 2 and 3) for slidably receiving legs 13A and 13B therein. Upper cross member 17 also includes openings 21, 22 for receiving legs 14A, 14B of the second leg unit 14. It will be appreciated that the top part of legs 14A, 14B are fixedly received in openings 21 and 22. Openings 21 and 22 act to hold legs 14A, 14B is spaced apart relationship.

The lower ends of legs 14A, 14B are also received in similar openings formed in lower cross member 18. This acts to hold the lower ends of legs 14A, 14B in spaced apart relationship.

It will be appreciated from the above described construction that the upper and lower cross members 17, 18 are spaced apart by a fixed amount, this being the length of the legs 14A, 14B.

Although not clearly shown in the accompanying drawings, the lower cross member 18 also includes an aperture in the lower part therein to allow the leg 15A of the third leg unit to pass therethrough, such that the leg 15A of the third leg unit 15 can be slidably moved relative to the legs 14A, 14B of the second leg unit.

The upper cross member 17 also includes a first fixing means mounted therein for selectively locking and unlocking the first leg unit in position relative to the second leg unit. Similarly, the lower cross member 18 includes a second fixing means for selectively locking and unlocking the third leg unit in position relative to the second leg unit. As the first fixing means and second fixing means are mounted within respective upper and lower cross members 17, 18, they are not visible and therefore are not shown in FIGS. 1 to 3. It will be appreciated that the fixing means may be of any construction known to be suitable to those skilled in the art.

Figure 2:
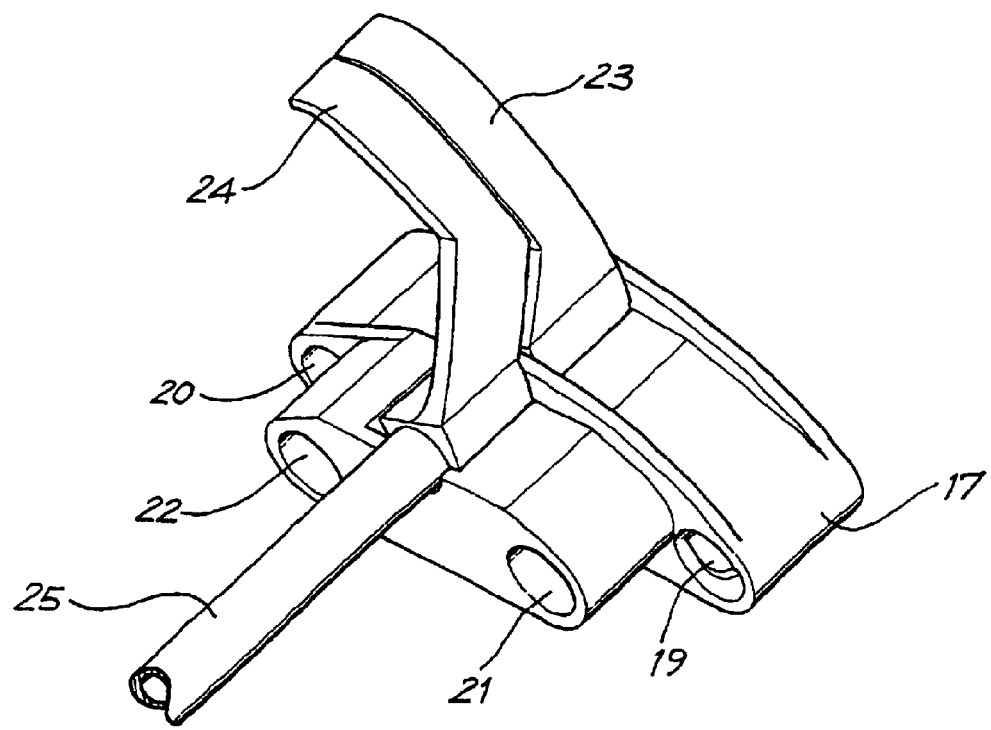
FIG. 2 shows a three-dimensional view of the top cross member of the tripod of FIG. 1 with the first and second actuating means in the unlocked position.
Figure 3:
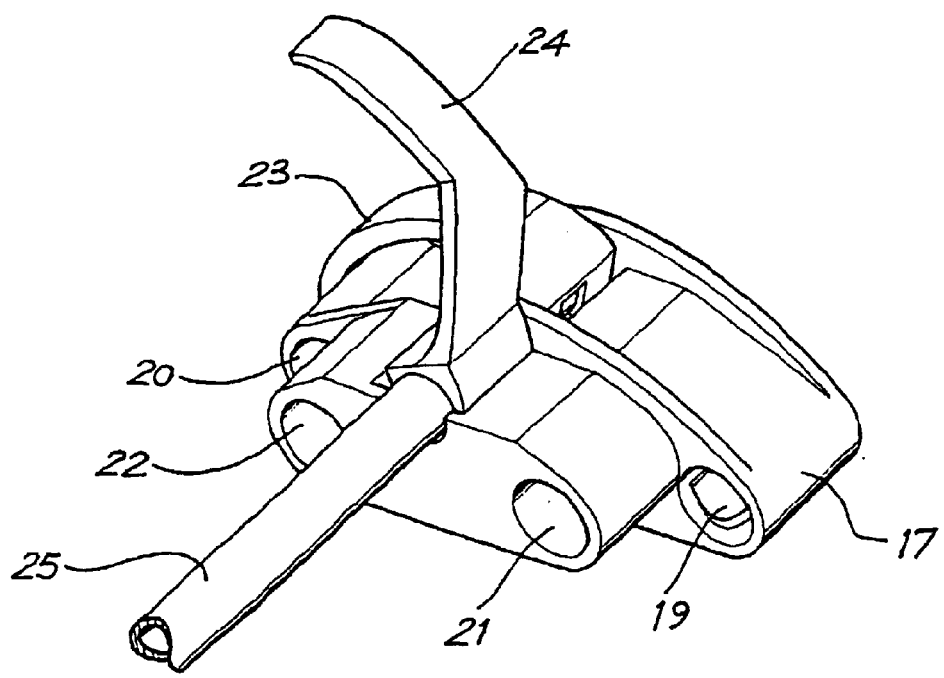
FIG. 3 shows a view generally similar to FIG. 2 but with the top actuating means in the locked position.

The leg assembly 12 shown in FIGS. 1 to 3 also includes a first actuating means 23 which takes the form of a lever pivotally mounted to upper cross member 17. The lever 23 can be moved from an open position, as shown in FIGS. 1 and 2, to a closed position, as shown in FIG. 3. In the open position shown in FIGS. 1 and 2, the first fixing means is in the unlocked position and the first leg unit can slide freely relative to the second leg unit. In the closed position shown in FIG. 3, the first actuating means locks the first fixing means such that the first leg unit 13 is locked against movement relative to the second leg unit 14, thereby locking the first leg unit into position relative to the second leg unit.

The apparatus further includes a second actuating means 24 that is connected via torsion bar 25 to the second fixing means mounted within lower cross member 18. As can be best seen from FIGS. 1 and 2, second actuating means 24 is in the form of a lever that is positioned substantially adjacent to and below first actuating means or lever 23. The positioning of the second actuating means 24 in close proximity to first actuating means 23 allows the hand of a user to engage both first and second actuating means 23, 24 simultaneously to thereby enable essentially simultaneous actuation of first and second actuating means 23, 24 to thereby selectively lock or unlock both the first fixing means and the second fixing means. It will be appreciated that actuation of second actuating means 24 causes rotation of torsion bar 25 which then acts on the second fixing means to move the second fixing means between the locked and unlocked positions. Second actuating means 24 is mounted independently to first actuating means 23 in the embodiment shown in the Figures It will be appreciated that first actuating means 23 and second actuating means 24 are not connected to each other. This enables first actuating means 23 to be actuated separately and independently to second actuating means 24 (and vice versa). Therefore, it is possible to operate the first fixing means without operating the second fixing means (and vice versa). For example, as shown in FIG. 3, the first actuating means 23 has been moved to the locked position, thereby locking first fixing means such that the first leg unit is fixed relative to the second leg unit, whilst the second actuating means 24 has not been operated such that the second fixing means is still in the unlocked state, thereby allowing relative movement between the second leg unit and the third leg unit. This enables further adjustment of the third leg unit to take place.

It will also be appreciated that the positioning of the second actuating means 24 in the embodiments shown in the drawings is well above the position of the second fixing means. In normal use of the apparatus of the invention, this places the second actuating means 24 at a much more convenient height for the user. It will be appreciated that, in most prior art tripods, the second actuating means was located on the lower cross member 18. This required the user to bend over to operate the second actuating means. It will also be appreciated that the present invention also encompasses other positioning of the first and second actuating means. For example, the first and second actuating means may be located near the second locking means, or both may be positioned intermediate the first and second locking means or above the first and second locking means. However, the positioning as shown in FIGS. 1 to 4 and 7 and 8 is most preferred.

Figure 5:
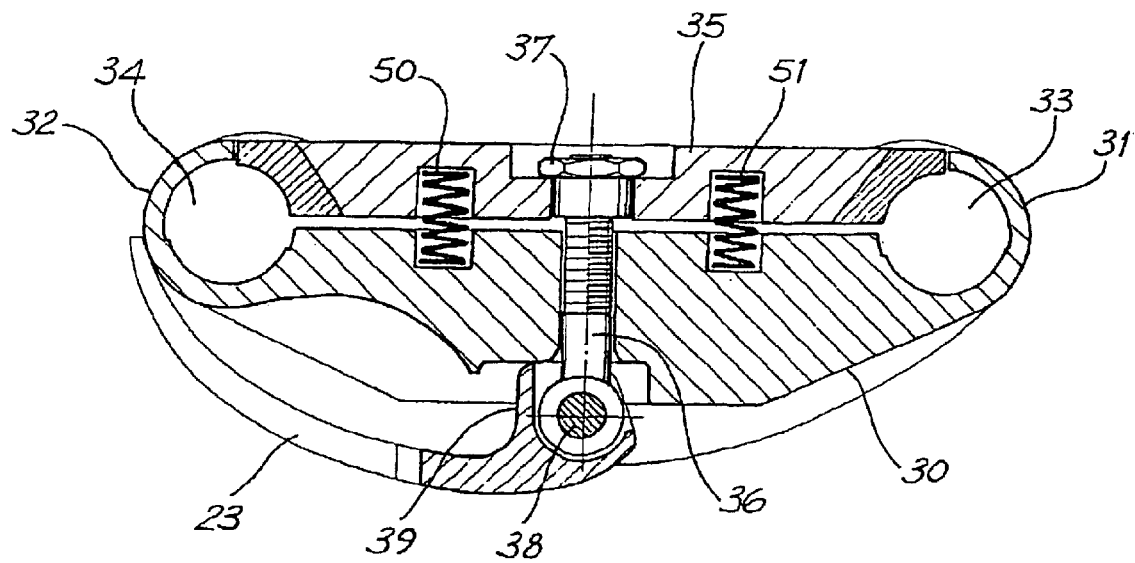
FIG. 5 is a cross-sectional view of a first fixing means suitable for use in the present invention.
Figure 6:
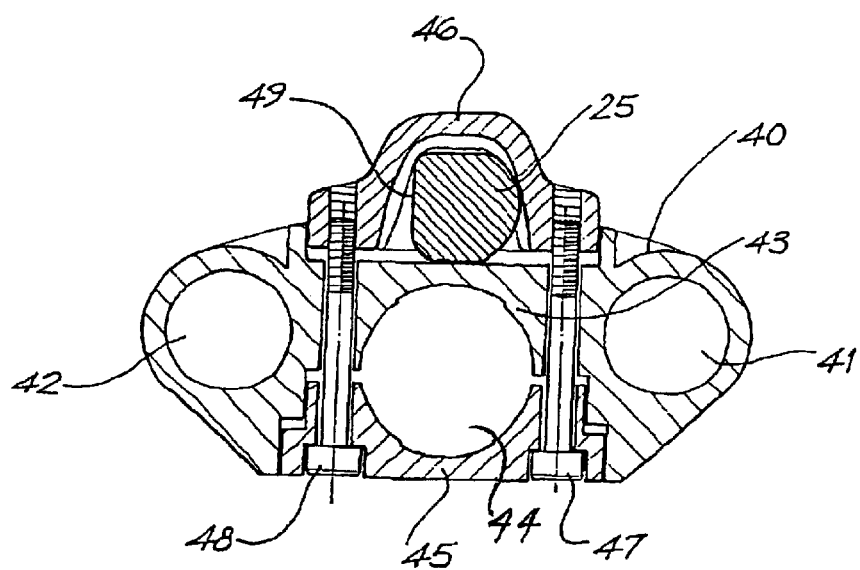
FIG. 6 is a cross-sectional view of a second fixing means suitable for use in the present invention.

Specific embodiments of currently preferred constructions for the first and second fixing means are shown in FIGS. 5 and 6. It will be appreciated that the fixing means shown in FIGS. 5 and 6 are only examples of suitable fixing means that may be used in the present invention and that the present invention extends to include use all suitable fixing means.

The fixing means shown in FIG. 5 is preferably the upper fixing means. It includes a main body portion 30 having arcuate extensions 31, 32 that act to form part of openings 33, 34 through which legs 13A, 13B can slidably pass when the fixing means is unlocked. A clamping plate 35 is attached to the main body portion 30 by a bolt 36 and nut 37. A spring may be provided on the shank of bolt 36 to bias the clamping plate 35 away from the main body portion 30 when the fixing means is in the unlocked position. Alternatively, and as shown in FIG. 5, springs or other biasing means 50, 51 may be provided at locations away from the bolt to bias the clamping plate away from the main-body portion 30.

The head of bolt 36 has lever 23 pivotally attached thereto such that lever 23 can rotate about pivot point 38. Lever 23 has an eccentric 39 formed thereon which allows the lever 23 to be biased into either the locked position or unlocked position by moving the lever 23 through a dead centre.

When the fixing means shown in FIG. 5 is in the locked position, the clamping plate 35 bears against the legs 13A, 13B to thereby lock those legs against sliding movement. When it is in the unlocked position, the clamping plate 35 does not contact or only loosely contacts the legs 13A, 13B to thereby allow slidable movement of the legs through holes 33, 34.

A suitable construction for the lower fixing means is shown in FIG. 6. The lower fixing means includes a main body portion 40 that defines holes 41, 42 for receiving the lower ends of legs 14A, 14B. Holes 41, 42 preferably have closed lower ends. Legs 14A and 14B are suitably fixed in holes 41, 42. Hole 44, through which leg 15A of the third leg unit can slidably move, is defined by intermediate body portion 43 and clamping member 45. Intermediate body portion 43 is part of main body portion 40. Main body portion 40 also includes housing 46 for receiving torsion rod 25.

Bolts 47, 48 pass through main body portion 40 and extend from clamping member 45 to housing 46. As can be seen from FIG. 6, the end of torsion rod 25 that fits into housing 46 has an eccentric shape. When the torsion rod 25 is in the position shown in FIG. 6, housing member 46 is urged away from intermediate body portion 43. This in turn pulls clamping member 45 towards the main body portion 40 (and the intermediate body portion 43) by bolts 47, 48 and clamps the outer wall of leg 15A against sliding movement. In this position, the fixing means shown in FIG. 6 is locked. If the torsion rod 25 is moved in an anti-clockwise direction by actuating lever 24 in that direction, flat land 49 of torsion rod 25 is positioned adjacent intermediate body portion 43 such that clamping member 45 can move away from intermediate body portion 43. In this position, the clamping members 43, 45 do not contact or only loosely contact leg 15A, thereby allowing slidable movement of leg 15A through hole 44. It is preferred that clamping member 45 is biased such that it tends to move away from intermediate body portion 43 in the unlocked position.

From FIG. 6, it can be seen that rotation of the torsion rod 25 by actuation of lever 24 can lock and unlock the second fixing means.

Figure 7:
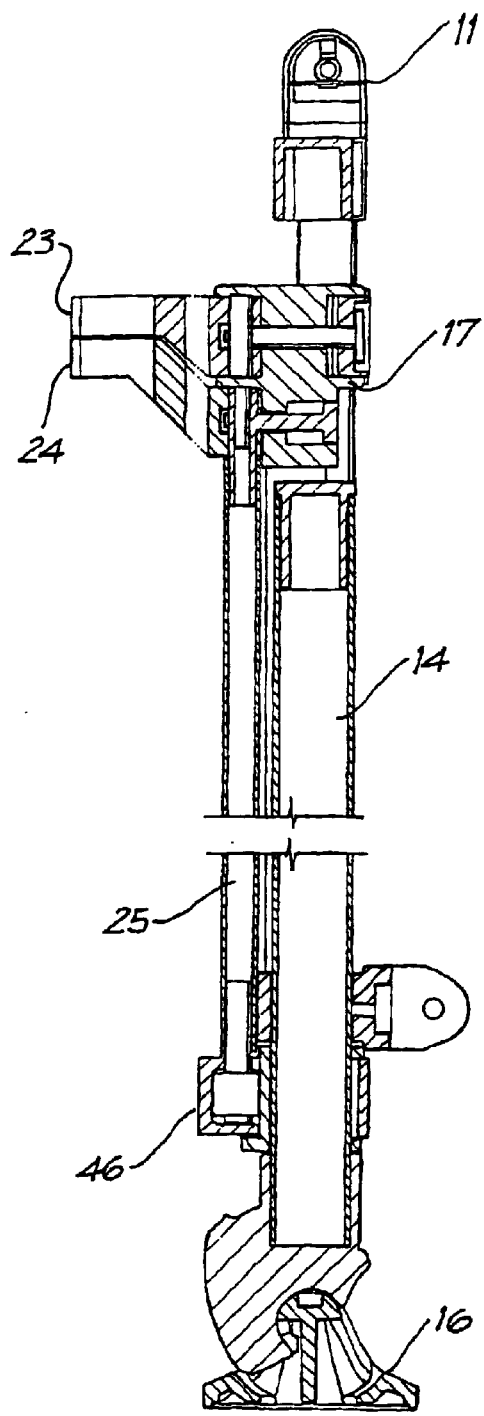
FIGS. 7 and 8 are side views of the apparatus of FIG. 1.
Figure 8:
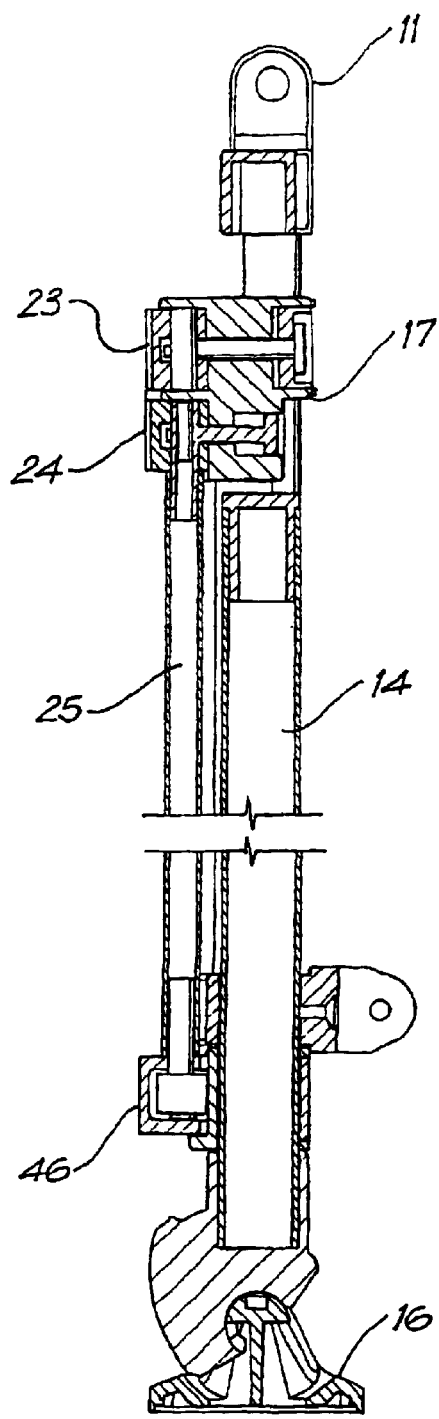

A side view of the apparatus of the present invention is shown in FIGS. 7 and 8. In FIG. 8, levers 23, 24 are in the locked position. FIG. 7 and 8 show that torsion rod 25 is positioned laterally from the three leg units 13, 14, 15. However, the torsion rod 25 may be positioned co-planar with the leg units if desired, or even positioned within one of legs 14A or 14B.

Those skilled in the art will appreciate that the present invention may be subject to variations and modifications other than those specifically disclosed. It is to be understood that the present invention encompasses all such variations and modifications that fall within its spirit and scope.

What is claimed is:

1. A support means of adjustable height comprising at least one leg assembly having a first leg unit, a second leg unit and a third leg unit, said first and second leg units being slidably movable relative to each other, said second and third leg units being slidably movable relative to each other, first fixing means for selectively locking and unlocking the first leg unit relative to the second leg unit, second fixing means for selectively locking and unlocking the third leg unit relative to the second leg unit, first actuating means for selectively actuating the first fixing means between locked and unlocked positions and second actuating means for selectively actuating the second fixing means between locked and unlocked positions, characterised in that the first and second actuating means are independently actuatable to selectively and independently lock or unlock the first fixing means and the second fixing means, and that the first actuation means and the second actuating means are positioned in close proximity to each other such that the first actuating means and the second actuating means can be operated essentially simultaneously by a user to thereby essentially simultaneously lock or unlock the first fixing means and the second fixing means, irrespective of the positions of the first, second and third leg units relative to each other.

2. A support means according to claim 1 wherein the first actuating means and the second actuating means are positioned substantially adjacent to each other.

3. A support means according to claim 2 wherein the second actuating means is positioned adjacent to and below the first actuating means.

4. A support means as claimed in any one of claims 1 to 3 wherein the second actuating means is positioned away from the second fixing means and the second actuating means is connected to the second fixing means by a connecting member.

5. A support means as claimed in claim 4 wherein the connecting member comprises a torsion bar.

6. A support means as claimed in claim 1 wherein at least one of the first or second fixing means comprises a clamping means for selectively clamping the leg units to prevent relative movement of the leg units.

7. A support means as claimed in claim 1 wherein the first actuating means comprises a first lever and the second actuating means comprises a second lever.

8. A support means as claimed in claim 7 wherein the first and second levers rotate around respective pivot points.

9. A support means as claimed in claim 7 wherein the first and second levers include an eccentric such that the levers can be moved to overcome a dead centre to thereby lock respective fixing means.

10. A support means as claimed in claim 1 wherein the first fixing means and the second fixing means are mounted to the second leg unit.

11. A support means as claimed in claim 10 wherein the second leg unit comprises a plurality of legs spaced laterally apart, with a first cross member extending between the legs to hold the legs in spaced apart relationship, the first cross-member including receiving means for slidably receiving one or more legs of the first leg unit, a second cross member extending between the plurality of legs of the second leg unit, the second cross member including receiving means for slidably receiving one or more legs of the third leg unit.

12. A support means as claimed in claim 11 wherein the first fixing means clamps the one or more legs of the first leg unit and the second fixing means clamps the one or more legs of the third leg unit.

13. A support means as claimed in claim 1 wherein the leg units are telescopically slidable relative to each other.

14. A support means as claimed in claims 11 or 12 wherein the first fixing means is mounted on the first cross member and the second fixing means is mounted on the second cross member.

15. A support means as claimed in claim 1 comprising a tripod.

16. A leg assembly having a first leg unit, a second leg unit and a third leg unit, said first and second leg units being slidably movable relative to each other, said second and third leg units being slidably movable relative to each other, first fixing means for selectively locking and unlocking the first leg unit relative to the second leg unit, second fixing means for selectively locking and unlocking the third leg unit relative to the second leg unit, first actuating means for selectively actuating the first fixing means between locked and unlocked positions and second actuating means for selectively actuating the second fixing means between locked and unlocked positions, characterised in that the first and second actuating means are independently actuatable to selectively and independently lock and unlock the first fixing means and the second fixing means and the first actuating means respectively, and that the second actuating means are positioned in close proximity to each other such that the first actuating means and the second actuating means can be operated essentially simultaneously by a user to thereby essentially simultaneously lock or unlock the first fixing means and the second fixing means, irrespective of the positions of the first, second and third leg units relative to each other.

* * * * *